(12) United States Patent
Huber et al.

(10) Patent No.: US 10,911,901 B2
(45) Date of Patent: Feb. 2, 2021

(54) POSITIONING SOLUTION

(71) Applicant: Telia Company AB, Solna (SE)

(72) Inventors: Michael Huber, Täby (SE); Rickard Damm, Nacka (SE)

(73) Assignee: TELIA COMPANY AB, Solna (SE)

( * ) Notice: Subject to any disclaimer, the term of this patent is extended or adjusted under 35 U.S.C. 154(b) by 0 days.

(21) Appl. No.: 16/697,538

(22) Filed: Nov. 27, 2019

(65) Prior Publication Data

US 2020/0178034 A1 Jun. 4, 2020

(30) Foreign Application Priority Data

Nov. 29, 2018 (FI) ...................................... 20186009

(51) Int. Cl.
*H04W 4/029* (2018.01)
*H01Q 13/20* (2006.01)
*H01R 24/40* (2011.01)

(52) U.S. Cl.
CPC .......... *H04W 4/029* (2018.02); *H01Q 13/203* (2013.01); *H01R 24/40* (2013.01); *H01R 2201/02* (2013.01); *H01R 2201/04* (2013.01)

(58) Field of Classification Search
CPC ...... H04W 4/029; H01Q 13/203; H01R 24/40
See application file for complete search history.

(56) References Cited

U.S. PATENT DOCUMENTS

| 9,244,148 B1 | 1/2016 | Sternowski | |
|---|---|---|---|
| 2013/0281084 A1* | 10/2013 | Batada | H04W 4/80 455/426.1 |

FOREIGN PATENT DOCUMENTS

| JP | 2012083339 A | 4/2012 |
|---|---|---|
| WO | 2009018815 A2 | 2/2009 |
| WO | 2013182021 A1 | 12/2013 |

OTHER PUBLICATIONS

EPO—Google Translated CN102721430 WO2013182021 (Year: 2013).*
Finnish Search Report, dated May 17, 2019, from corresponding Finnish patent application No. 20186009.

* cited by examiner

*Primary Examiner* — Ernest G Tacsik
(74) *Attorney, Agent, or Firm* — Nixon & Vanderhye

(57) ABSTRACT

Disclosed is a communication system for positioning of a terminal device. The communication system includes at least three leaky coaxial cables, a server device for determining a position of a terminal device in response to a receipt of data from the terminal device through at least two coaxial cables. The server device is arranged to determine an indicator value representing the at least two coaxial cables through which the data from the terminal device is received and to compare the indicator value to change patterns stored in data storage accessible to the server device, and in response to a match in a comparison to generate data representing the position of the terminal device. Also disclosed is a method for positioning the terminal device.

4 Claims, 2 Drawing Sheets

|  | UE ID | Source Cell | Destination cell |
|---|---|---|---|
| Vertical direction | UE1 | Cell 2 | Cell 3 |
|  | UE1 | Cell 3 | Cell 4 |
|  |  |  |  |
| Horizontal direction | UE1 | Cell 4 | Cell 1 |
|  | UE1 | Cell 1 | Cell 2 |
|  | UE1 | Cell 2 | Cell 4 |

POSITIONING SOLUTION

TECHNICAL FIELD

The invention concerns in general the technical field of communication systems. More particularly, the invention concerns positioning of a terminal device.

BACKGROUND

There is need to implement communication networks in varied locations. Examples of challenging locations are tunnels and mines wherein a limited number of ways to implement the communication network is available.

On the other hand, in many occasions there is need to locate the terminal device. Open air environment allows a utilization of a plurality of positioning technologies, but so-called closed spaces, such as a tunnel or mine, limits applicable positioning technologies to few only. Nowadays, a positioning technology used in closed spaces, such as in the tunnels or the mines, is usually based on separate beacon devices, communicating e.g. with Bluetooth technology, on the basis of which a position of the terminal device may be determined. However, such an implementation needs separate system management as well as is vulnerable to malfunctions.

Hence, there is need to introduce solutions mitigating the drawbacks of the prior art solutions.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a communication system and a method for positioning a terminal device.

The objectives of the invention are reached by a communication system and a method as defined by the respective independent claims.

According to a first aspect, a communication system for positioning of a terminal device is provided, the communication system comprises: at least three leaky coaxial cables, each having an inner conductor, an outer conductor and isolation layer between the inner conductor and the outer conductor, wherein the outer conductor comprises at least one slot, the slots arranged consecutive to each other along longitudinal axes of the leaky coaxial cables to leak radio frequency signals; a server device for determining a position of a terminal device in response to a receipt of data from the terminal device through at least two coaxial cables, the server device is arranged to determine an indicator value representing the at least two coaxial cables through which the data from the terminal device is received and to compare the indicator value to change patterns stored in data storage accessible to the server device, and in response to a match in a comparison to generate data representing the position of the terminal device.

According to a second aspect, a method of positioning of a terminal device communicating with a communication system, the communication system comprising at least three leaky coaxial cables, each having an inner conductor, an outer conductor and isolation layer between the inner conductor and the outer conductor, wherein the outer conductor comprises at least one slot, the slots arranged consecutive to each other along longitudinal axes of the leaky coaxial cables to leak radio frequency signals, the method comprising: receiving, by the server device, data from the terminal device through at least two coaxial cables; determining, by the server device, an indicator value representing the at least two coaxial cables through which the data from the terminal device is received; and comparing the indicator value to change patterns stored in data storage accessible to the server device, and in response to a match in a comparison generating data representing the position of the terminal device.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
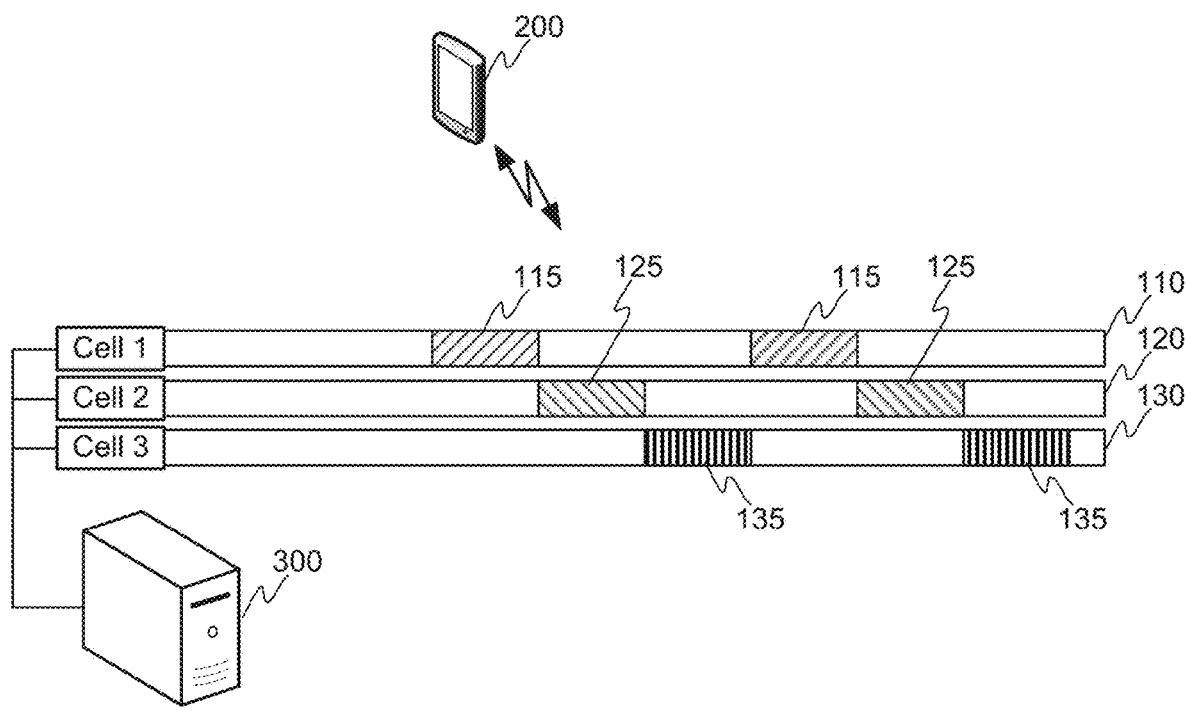
FIG. 1 illustrates schematically an example of a communication system according to an embodiment of the invention.

The present invention, according to at least one embodiment of the invention, relates to a positioning system. A non-limiting example of the positioning system according to an embodiment of the invention is schematically illustrated in FIG. 1. The positioning system according to at least some embodiments of the invention may be implemented by utilizing a plurality of so-called leaky coaxial cables 110, 120, 130 as antennas. The term leaky coaxial cable refers at least to an antenna implementation in which the leaky coaxial cable comprises an inner conductor, an outer conductor and an isolation layer between the inner conductor and the outer conductor. Moreover, one or more slots 115, 125, 135 may be arranged along the coaxial cable 110, 120, 130 in question for providing a path for a signal input to the cable 110, 120, 130 so that the signal may be leaked as a radio frequency signal through the at least one slot to one way or another. According to at least some embodiments of the invention the solution may comprise three leaky coaxial cables 110, 120, 130 which are arranged to travel substantially together with each other in a space in which they operate as antennas for the communication network. According to the present invention the slots 115, 125, 135 of the different coaxial cables 110, 120, 130 are positioned so that each slot 115, 125, 135 form a service area within the space so that the service areas are not essentially overlapping, or at least so that the signal characteristics are set so that a terminal device is achieved to be handovered from one service area to another when the terminal device roams in the space. For example, by referring to the network implementation as schematically illustrated in FIG. 1 a terminal device when roaming from left to right substantially along a direction of the leaky coaxial cables 110, 120, 130 may be first served by a slot 115 of the first coaxial cable 110, next by the slot 125 of the second coaxial cable 120, next by the slot 135 of the third coaxial cable 130, and after that the terminal device returns to be served by the other slot 115 of the first coaxial cable 110, and so on. The slots through which the service areas may be established may, hence, be arranged consecutively to each other between the different cables.

As indicated in FIG. 1 it may be derived that the coaxial cables 110, 120, 130 form cells (Cell 1, Cell 2, Cell 3) providing communication services essentially consecutive to each other along the paths of the cables.

The positioning of the terminal device 200 may be arranged, according to at least some embodiments of the present invention, so that the terminal device 200 may be arranged to establish a communication connection to a server 300 through the antenna network implemented with the coaxial cables 110, 120, 130. Even if it is schematically depicted in FIG. 1 that the coaxial cables 110, 120, 130 are directly communicatively coupled to the server 300 there may exist other entities, such as one or more base stations between these two. According to at least some embodiments of the invention the server 300 may be arranged to maintain data indicating which coaxial cable 110, 120, 130, i.e. the cell, serves the terminal device 200. According to an embodiment, the server 300 may be arranged to maintain at least data of the coaxial cable 110, 120, 130 currently serving the terminal device 200 and data of the coaxial cable 110, 120, 130 which served the terminal device 200 before the currently serving coaxial cable 110, 120, 130.

Now, when the terminal device 200 roams in the space, such as in a tunnel, it may get access to the communication network through the slots 115, 125, 135 of the coaxial cables 110, 120, 130. In the communication the terminal device 200 may be arranged to transmit its identifier, such as a device identifier or an identity of a subscriber identity module, to the server 300. The server 300 may derive in a context of a receipt of the signal carrying the identifier representing the terminal device 200 through which coaxial cable 110, 120, 130 the signal was received. For example, the coaxial cables 110, 120, 130 may be assigned individual identifiers, such as cell identifiers. At some point the server 300 may detect that it possesses data received from two separate coaxial cables 110, 120, 130 indicating that a same terminal device 300 is served. In response to such a detection it may be arranged to initiate a determination of a position of the terminal device 200 in the space. The determination of the position may be performed by generating an indicator value representing a change of the serving coaxial cables 110, 120, 130 expressed e.g. so that a previously serving cable is expressed first and the new serving cable 110, 120, 130 is expressed second, like Cell 1→Cell 2. Now, the server 300 may be arranged to compare the generated indicator to a prestored change patterns in data storage accessible to the server device 300. The comparison may e.g. be performed so that the server 300 is arranged to generate an inquiry to the data storage, the inquiry comprising the generated indicator. The data storage may be arranged to return, as a response to the inquiry, a position of the terminal device 200 in the space if a data record corresponding to the indicator is found. In this kind of implementation data structure in the data storage may e.g. comprise a plurality of change patterns (i.e. combinations of possible changes of the serving coaxial cables) as data records to be searched and for each data record data comprising information expressing a position corresponding to the change pattern in question.

The above described implementation may be improved if the server 300 is arranged to generate the indicator so that it comprises information on more than one change of the serving coaxial cables 110, 120, 130. In such a manner it is possible to implement a plurality of change patterns by means of which it is possible to indicate the position of the terminal device 200 in more unambiguously.

Figure 2:
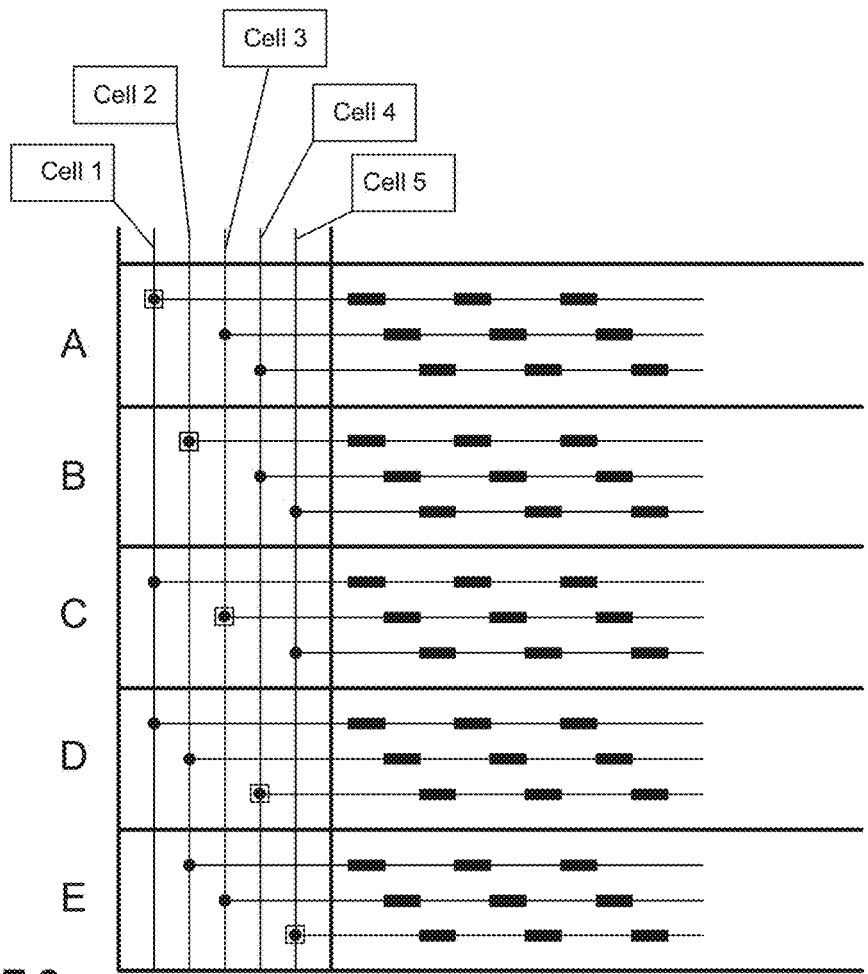
FIG. 2 illustrates schematically another example of a communication system according to an embodiment of the invention.

In a multi-level environment, i.e. in an environment in which there are a plurality of floors into which a communication network utilizing the leaky coaxial cables 110, 120, 130 may be implemented, further positioning methods may be implemented. Namely, it may be arranged that the communication network system may comprise an implementation in which a position of the terminal device may be determined also in a vertical direction to some extent in addition to a horizontal direction as schematically illustrated in FIG. 1. Such a multi-level environment is schematically illustrated in FIG. 2. In FIG. 2 there is illustrated five levels A, B, C, D, E on which there are spaces into which a communication system according to at least some embodiments of the present invention is implemented. The environment as schematically illustrated in FIG. 2 may be considered as a mine having tunnel at each level. According to at least one embodiment of the invention there is arranged a plurality of cables, e.g. a corresponding number to the levels, to run in a vertical direction so that the leaky coaxial cables 110, 120, 130 arranged horizontally in the spaces at the levels may be coupled to the vertical cables and in that manner a communication to and from the spaces may be arranged to. In FIG. 2 the slots 115, 125, 135 of the coaxial cables 110, 120, 130 at different levels are schematically illustrated with black rectangular boxes in order to bring out the implementation corresponding to the implementation shown in the more detailed FIG. 1. An advantage of arranging a plurality of cables running in a vertical direction in the multi-level environment is that it improves a positioning of a terminal device 200. Moreover, by having an arrangement of bringing the signals to the spaces among the plurality of cells (Cell 1-Cell 5) in a distributed manner it is possible to differentiate signal patterns at each level and in that way to mitigate any interference in communication but also in the determination of the position. Still further, it may be arranged so that at least one transmission slot 115, 125, 135 of at least one coaxial cable 110, 120, 130 may be arranged at each level A, B, C, D, E so that when the terminal device 200 travels a path along which the terminal device 200 may travel between the different levels A, B, C, D, E it may access to the communication network through the slot arranged to a cable at a level in question. These slots are depicted with a black circle in a square in FIG. 2. In this manner it is possible to arrange that the vertical path at different levels is served by different cell. For example, in the environment of FIG. 2 the mapping may be the following:

| Level | Serving cell (cable) |
|---|---|
| A | Cell 1 |
| B | Cell 2 |
| C | Cell 3 |
| D | Cell 4 |
| E | Cell 5 |

This kind of mapping improves the positioning in a sense that it enables a monitoring of the position of the terminal device 200 also in a vertical direction. Hence, if it is determined, i.e. the server device 300 receives data from the network, that the terminal device has changed a service from Cell 2 to Cell 3 and it next receives service from Cell 2 again it may be concluded that the terminal device 200 has roamed vertically from level B to level C and walked in a tunnel of level C onwards. As mentioned by collecting data a longer period of time, or detecting more serving cells, the position of the terminal device 200 may be unambiguously determined.

Figures 3, 4:
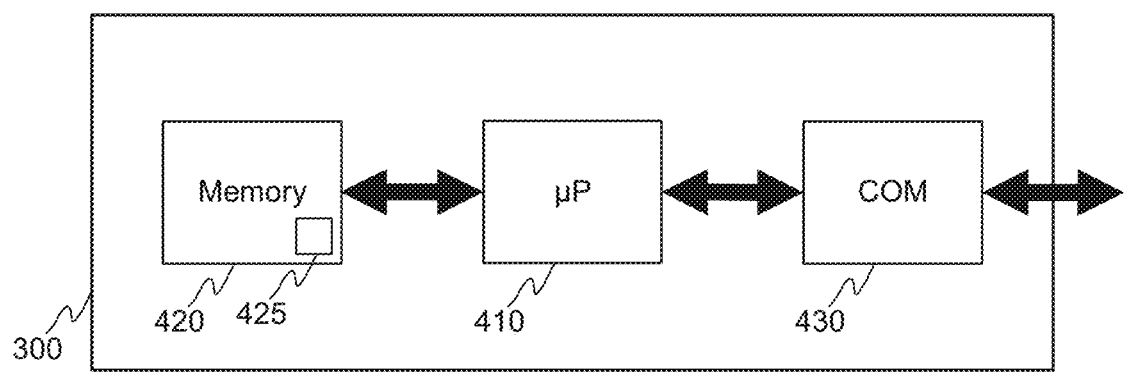
FIG. 3 illustrates schematically a data structure according to an embodiment of the invention.
FIG. 4 illustrates schematically a server device according to an embodiment of the invention.

FIG. 3 illustrates schematically an example of a data structure collected in the server 300 wherein the data structure stores data representing a motion of the terminal device 200 in the environment served by the communication system. The server 300 may be arranged to store information on the terminal device both in a vertical direction and in a horizontal direction. For example, the data structure may store data on a basis of an identifier of the terminal device (UE ID). Additionally, it may store data on a source cell and a destination cell in accordance with the motion of the terminal device 200. According to another embodiment of the invention the data structure may also store data indicating a time when a certain data record is received by the server 300 and/or stored in the data structure. This may be taken into account when determining the position of the terminal device 200. For example, the time information may be used for filtering out certain data records for the positioning. In some embodiment of the invention it may be arranged that the terminal device 200 when accessing an environment in which the communication system according to the present invention is implemented to may be identified and any previous data records stored in the data structure are deleted. With this arrangement it is possible to establish a positioning session on its own and the determination of the position is efficient.

FIG. 4 schematically illustrates an example of a server device 300 arranged to perform a positioning of the terminal device 200. The server device 300, when implemented as a device, may comprise a processing unit 410 comprising one or more processors, a memory unit 420 comprising one or more memory devices and a communication interface 430 comprising one or more communication devices, such as one or more modems, one or more data buses and/or one or more other devices. Advantageously, the memory unit 420 may store portions of computer program code 425 and any other data, and the processing unit 410 may cause the server device 300 to operate as described by executing at least some portions of the computer program code stored in the memory unit 420. For example, the memory unit 420 may be arranged to maintain a data structure as illustrated in FIG. 3. The physical implementation of the server device 300 may be centralized or distributed.

At least some aspects of the present invention may relate to a processor-readable non-transitory storage medium on which is stored one or more sets of processor executable instructions, e.g. in a form of portions of computer program code 425, configured to implement one or more of steps of the method as described. The instructions may also reside, completely or in part, within a main memory, the static memory, and/or within the processor during execution thereof by the at terminal device in question. The term computer-readable medium shall also cover, but is not limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other information archive or set of archives considered to be a distribution medium equivalent to a tangible storage medium.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A communication system for positioning of a terminal device, the communication system comprising:
at least three leaky coaxial cables, each of the at least three leaky coaxial cables having an inner conductor, an outer conductor and isolation layer between the inner conductor and the outer conductor, wherein the outer conductor of each of the at least three leaky coaxial cables comprises at least one slot, the slots arranged consecutive to each other along longitudinal axes of the at least three leaky coaxial cables to leak radio frequency signals, and
a server device for determining a position of a terminal device in response to a receipt of data from the terminal device through at least two of the at least three leaky coaxial cables collected respectively at a first point in time and a later second point in time,
wherein the server device is arranged to determine an indicator value representing the at least two leaky coaxial cables through which the data from the terminal device is received and to compare the indicator value to change patterns stored in data storage accessible to the server device, and in response to a match in a comparison to generate data representing the position of the terminal device.

2. A method of positioning of a terminal device communicating with a communication system, the communication system comprising at least three leaky coaxial cables, each of the at least three leaky coaxial cables having an inner conductor, an outer conductor and isolation layer between the inner conductor and the outer conductor, wherein the outer conductor of each of the at least three leaky coaxial cables comprises at least one slot, the slots arranged consecutive to each other along longitudinal axes of the at least three leaky coaxial cables to leak radio frequency signals, the method comprising:
receiving, by the server device, data from the terminal device through at least two of the at least three leaky coaxial cables collected respectively at a first point in time and a later second point in time, determining, by the server device, an indicator value representing the at least two leaky coaxial cables through which the data from the terminal device is received, and comparing the indicator value to change patterns stored in data storage accessible to the server device, and in response to a match in a comparison generating data representing the position of the terminal device.

3. The system of claim 1, wherein the change patterns stored in data storage accessible to the server device indicate both a vertical and a horizontal position of the terminal device and the generated data representing the position of the terminal device includes both the vertical and the horizontal position of the terminal device.

4. The method of claim 2, wherein the change patterns stored in data storage accessible to the server device indicate both a vertical and a horizontal position of the terminal device and the generated data representing the position of the terminal device includes both the vertical and the horizontal position of the terminal device.

\* \* \* \* \*